United States Patent

Sartor et al.

[11] Patent Number: 5,979,109
[45] Date of Patent: *Nov. 9, 1999

[54] METHOD FOR GROWING MUSHROOMS ON PROTEIN-CONTAINING SUBSTRATE

[75] Inventors: Tommaso Sartor, Volpago Del Montello; Davide Brini, Pederobba, both of Italy

[73] Assignee: SARTOR Tommaso, Volpago del Montello, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/501,785

[22] Filed: Aug. 9, 1995

[30] Foreign Application Priority Data

Aug. 12, 1994 [IT] Italy .................... TV94A0101

[51] Int. Cl.$^6$ .................................... A01G 1/04
[52] U.S. Cl. ............... 47/1.1; 435/256.8; 435/254.1
[58] Field of Search .............. 47/1.4; 435/256.8, 435/255.7, 254.1

[56] References Cited

U.S. PATENT DOCUMENTS 2,648,163  8/1953  Szvecs .
3,545,953  12/1970  Kinya et al. .
3,828,470  8/1974  Stoller ........................................ 47/1.4

FOREIGN PATENT DOCUMENTS 2592550  7/1987  France .
9313647  7/1993  WIPO .

*Primary Examiner*—Irene Marx

[57] ABSTRACT

A substrate for mycelium growth containing proteins that is constituted by a single product that is sterile prior to the inoculation of the mycelium and is composed, in weight percentages, of the mixture of a water retaining-dispensing component a) in the amount of 16 to 30% by weight of the total weight of components a),b),c) and d), mixed with a buffering component b) in the amount of 25 to 50% by weight of the weight of the water retaining-dispensing component a). The substrate furthermore comprises a protein-containing component c) in the amount of 45 to 75% by weight and a growth-promoting component in the amount of 5 to 25% by weight both with respect to the total weight of components a),b),c) and d) and sufficient water to reach a moisture level between 55 and 60% with respect to the overall weight of the final substrate composition, the protein content of the substrate being preferably 4–20% by weight with respect to the overall weight of the final substrate composition.

7 Claims, No Drawings

METHOD FOR GROWING MUSHROOMS ON PROTEIN-CONTAINING SUBSTRATE

BACKGROUND OF THE INVENTION

The present invention relates to a substrate for spawning mycelia into a compost and to the incorporation of proteins into composts.

In the cultivation of mushrooms, and particularly in the cultivation of Agaricus bisporus, commonly known as meadow mushroom, it is currently necessary to have nutrient substrates whereon the mycelium is sown.

In order to clarify the background of the problem, it is to be noted that mushrooms belong to the vegetable kingdom and, like almost all molds and bacteria, must be considered heterotrophic organisms that, since unable to produce organic substances directly from the mineral world, must resort to organic substances constituting other living organisms for their nutrition.

This type of metabolism imposes a dependent type of life, and therefore heterotrophic organisms can be considered saprophytes, parasites, or symbionts.

In the specific case at hand, cultivated mushrooms are saprophytes and therefore decompose organic substances of vegetable and animal origin in many different forms.

To grow mushrooms, it is therefore necessary to have a nutrient substrate, the choice whereof is restricted by economic factors and by the availability of the materials.

It is currently known to produce nutrient substrates essentially composed of cereal straw, fowl-dung, chalk, and water.

Cereal straw is the vegetable organic material that gives the compost adequate softness, whereas fowl-dung is the main source of nitrogen.

It is therefore known to mix and moisten these raw materials to promote spontaneous heating; the mass obtained is then mixed several times in the open air and placed in closed rooms, where fermentation and pasteurization are performed by adjusting parameters such as temperature and time.

The first compost degradation and transformation processes begin during fermentation and are performed by mesophilous and thermophilic microorganisms.

The pasteurization and conditioning step completes the biological and chemical processes that began during fermentation, and the purpose of pasteurization, which relies on a notable increase in temperature, is to eliminate residual parasitic forms arising during fermentation.

At the end of the conditioning step, the compost becomes selective and therefore suitable for sowing, said compost being placed beforehand in growing beds located inside greenhouses with a controlled microclimate.

This compost must be uniformly distributed throughout the thickness of the bed and on the surface thereof and must be supplemented with an additional protein source, usually soya.

The mycelium that covers the vegetable organic material subsequently becomes lanuginous and expands in the compost at a rate that depends not only on the cultivation system but also on the kind of mushroom and on the chemical and physical conditions of the compost.

It has been observed that in order to have a good production of mushrooms the nutrient substrate must be covered with a suitable soil, usually constituted by young or light-colored peat, black peat, and calcium carbonate.

This covering soil prevents the drying of the nutrient substrate, reduces temperature oscillations, and constitutes the support for the growth of the fruiting bodies; accordingly, it must be capable of absorbing the required amount of water, retaining it, and gradually releasing it.

Another characteristic of the covering soil is that it must maintain its structure even after being wet several times, and therefore must be soft, porous, and slightly coarse to allow adequate gas exchange within the beds and create a microclimate that favors the development of the mushroom, which begins with the accumulation of hyphae that join to form a very small pinhead-size spherical portion of tissue which is known as "primordium".

The primordium reaches the size of a pea after approximately one week, and the formation of the cap and of the stalk begins.

Under favorable conditions, it takes three days to pass from the pea stage to the stage of the normal, complete mushroom ready to be picked, although irregular growth patterns are observed in mushrooms.

Mushrooms are normally hand-picked when the cap is still closed, the tissue is firm, the rim of the cap is curved inwardly, the veil is intact, and the lamellae are not visible.

Going back to the analysis of the prior art, it is to be noted that the production process currently entails the initial production of the compost, its subsequent sowing with mycelium developed on caryopsides of cooked and sterilized rye, and the simultaneous introduction of a protein source, such as soya, which is prepared separately with organic acid and antiparasitic substances in order to prevent other molds from developing together with the mycelium.

This method of production has several drawbacks: first of all, the products are prepared with separate processes and therefore require resources, in terms of labor and means, that increase the overall cost of growing.

Furthermore, the additional protein source must be treated chemically, and this fact on one hand increases the cost of the final product and on the other hand leads to the possible presence of residual antiparasitic substances in the picked mushroom.

Finally, it is to be noted that this additional protein source added to a scarcely selective substrate is a source of nutrition for antagonist molds, which limit the normal development of the mycelium and sometimes suppress it.

SUMMARY OF THE INVENTION

The aim of the present invention is therefore to solve the above problems, eliminating the drawbacks of the prior art by providing an alternative substrate for mycelium growth which permits a reduction in overall costs for the growing of mushrooms, and particularly of Agaricus bisporus, at the same time permitting the elimination of the residual presence of any antiparasitic substances in the picked mushroom.

Within the scope of the invention is a substrate into which mycelia can be sown. Also within the scope of the invention is a substrate containing the mycelia, said substrate containing the mycelia being added to composts to spawn the mycelia into the composts for the cultivation of mushrooms. By way of said addition of the substrate to the composts, the incorporation of proteins into the composts is achieved.

Within the scope of the aim of the invention, an important object is to provide a substrate that allows faster development of the mycelium.

Another important object is to provide a substrate by which the formation of mycelium-antagonist molds is suppressed.

This aim, these objects, and others which will become apparent hereinafter are achieved by a substrate for spawning mycelia into composts and for the incorporation of proteins into mycelium composts, characterized in that it is constituted by a single product that is sterile prior to the inoculation of the mycelium. The substrate is composed, in weight percentages, of the mixture of the following components a),b),c),d) and e):

a) a water retaining-dispensing component, in the amount of 16 to 30% by weight of the total weight of components a),b),c) and d), mixed with b) a buffering component, in the amount of 25 to 50% by weight of the water retaining-dispensing component a) (or 4 to 15% by weight of the total weight of a),b),c) and d)); and c) a protein-containing component in the amount of 45 to 75% by weight of the total weight of components a),b),c) and d); and d) a growth-promoting component in the amount of 5 to 25% by weight of the total weight of the total weight of components a),b),c) and d); and e) sufficient water to reach a moisture level of 55 to 60% with respect to the overall weight of the final substrate composition.

The pH is preferably about 7.2.

Further characteristics and advantages of the present invention will become apparent from the following description of some particular formulations, described by way of example hereinafter.

DESCRIPTION OF THE PREFERRED EMBODIMENTS

With reference to the above description, some formulations of the substrate are given hereinafter, giving some non-limitative specifications regarding the elements that constitute the individual components, which may be replaced by any elements having the same function.

The substrate according to the present invention is therefore constituted by a single product, into which the mycelium is inoculated. Said product, alternatively referred to as the substrate, is composed, in terms of total weight percentages, of the mixture of various components, including a water retaining-dispensing component that is constituted, by way of non-limitative example, by materials such as sawdust or peat, in particular young peat. Young peat is a form of peat characterized as being a pale yellow or brown fibrous substance, resembling turf or compressed hay and containing conspicuous plant remains.

An appropriate buffering component is mixed with said water retaining-dispensing component and can be constituted by calcium carbonate.

An additional component of the composition is constituted by a protein component. Said protein component can be a high protein vegetable product from which the oil may or may not have been extracted such as those derived from soybeans, in particular fragmentized soybean seeds (oil not extracted) and/or soybean meal (oil extracted), the latter being a by-product of the oil extraction industry. The unextracted soybean seeds are generally used in the form of seeds which have been broken into pieces or fragmentized by e.g. crushing, chopping or grinding in a manner generally known in the art. The fragmentized soybean seeds and the soybean meal can be replaced by equivalent products derived from e.g. peanuts, cotton-seeds, sunflower seeds, corn and colza-seed, such products being familiar to the man skilled in the art.

An additional component of the composition is constituted by a growth-promoting component (containing a non-protein carbon source or source of energy such as starch or sugars), for example gluten and/or starch and in particular corn gluten and/or corn starch.

The unextracted fragmentized soybean seeds or any of the equivalent products indicated above can serve both as part or all of the protein-containing component and as part or all of the growth-promoting component insofar as such products may supply both the protein content (as a source of nitrogen) and the carbohydrate content (as a growth-promoting factor) of the final substrate.

The invention can furthermore be defined as a substrate for spawning mycelia into composts, constituting a single product that is sterile prior to the inoculation of the mycelium composed, in weight percentages, of the mixture of the following components a),b),c) and d):

a) a water retaining-dispensing component, in the amount of 16 to 30% by weight, of the total weight of components a),b) and c) mixed with b) a buffering component, in the amount of 25 to 50% by weight of the water retaining-dispensing component a) (or 4 to 15% by weight of the total weight of a),b) and c)); and c) protein-containing and growth-promoting component comprising one or more vegetable products, in the amount of 50 to 80% by weight of the total weight of components a),b) and c), said vegetable products containing protein as a source of nitrogen and furthermore containing carbohydrates as an energetic source to promote growth; and d) sufficient water to reach a moisture level of 55 to 60% with respect to the overall weight of the final substrate composition.

In particular, protein is present in the substrate in an amount ranging from 4 to 20% by weight with respect to the overall weight of the final substrate composition. Preferably, protein is present in an amount ranging from 5–15% by weight, more preferably 6–14% by weight and still more preferably 7–13% by weight with respect to the overall weight of the final substrate composition.

The vegetable products of component c) in the latter definition of the substrate can be composed of vegetable products selected from one or more of those described above (e.g. the above-described soybean products) such that the substrate contains the desired protein content and carbohydrates.

The substrate is made by mixing the components in the specified proportions and sterilizing the mixture.

A typical composition of the fragmented soybean seeds is 20–38% by weight raw protein, 35–50% by weight carbohydrates, 5–8% by weight raw fiber and 10–13% by weight moisture.

Typically, soybean meal contains 44–45% by weight raw protein, 30–32% by weight carbohydrates (principally starch and sugars), 6% by weight fiber and 12% by weight moisture.

Typically, corn gluten contains 20–22% by weight raw protein, 50–52% by weight carbohydrates (principally starch and sugars), 7% by weight fiber and 2% by weight fats.

All formulations disclosed herein can be made using products having the above range of compositions, thereby producing substrates according to the invention.

In certain embodiments of the invention, substrates have been made having a protein content of 7.4–15.2% by weight and a carbohydrate content of 9.7–21.5% by weight with respect to the weight of the final substrate composition. Thus, a typical range of composition for the substrate may be seen to be 7–16% by weight protein and 9–22% by weight carbohydrates.

Fiber is principally cellulose and lignin.

Some preferred but not exclusive formulations of the substrate are given hereinafter.

FORMULATION 1

The following components were mixed in the following percentages by weight:

| young peat | 24% |
| fragmentized soybean seeds | 60% |
| soybean meal | 10% |
| calcium carbonate | 6% (25% of the amount of peat) |

The moisture content of the above mixture was adjusted by the addition of water to 56% moisture by weight of the final substrate composition.

The characteristics of the final product are those of a sterile substrate prior to the inoculation of the mycelium, with 56% moisture and a pH of 7.2.

FORMULATION 2

The following components were mixed in the following percentages by weight:

| young peat | 26% |
| fragmentized soybean seeds | 50% |
| soybean meal | 10% |
| corn starch | 5% |
| calcium carbonate | 9% (35% of the amount of young peat) |

The moisture content of the above mixture was adjusted by the addition of water to 55–60% moisture by weight of the final substrate composition.

The characteristics of the final product are those of a sterile substrate prior to the inoculation of the mycelium. As a particular embodiment of the above formulation, the moisture content was 60% by weight and the pH was 7.2.

FORMULATION 3

The following components were mixed in the following percentages by weight:

| young peat | 18% |
| fragmentized soybean seeds | 50% |
| corn gluten | 20% |
| corn starch | 5% |
| calcium carbonate | 7% (39% of the amount of young peat) |

The moisture content of the above mixture was adjusted by the addition of water to 55–60% moisture by weight of the final substrate composition.

The characteristics of the final product are those of a sterile substrate prior to the inoculation of the mycelium. As a particular embodiment of the above formulation, the moisture content was 56% by weight and the pH was 7.2.

FORMULATION 4

The following components were mixed in the following percentages by weight:

| young peat | 30% |
| soybean meal | 45% |
| corn gluten | 10% |

-continued

| corn starch | 5% |
| calcium carbonate | 10% (33% of the amount of young peat) |

The moisture content of the above mixture was adjusted by the addition of water to 55–60% moisture by weight of the final substrate composition.

The characteristics of the final product are those of a sterile substrate prior to the inoculation of the mycelium. As a particular embodiment of the above formulation, the moisture content was 56% by weight and the pH was 7.2.

All these formulations produce optimum results; among all the listed formulations, preference is given to the second one.

FORMULATION 5

The following components were mixed in the following percentages by weight:

| Swedish peat | 29.4% |
| soybean meal | 50.5% |
| corn gluten | 4.2% |
| calcium carbonate | 15.9% |

Water was added in relation to the humidity of the above raw materials. An amount of water was added to bring the humidity content of the final substrate to 55 to 60%.

Specification of the materials:

Swedish peat:
  pH =4.3 (tolerance interval 4.0–4.5)
  humidity =56% (tolerance interval 55–65%)

Soybean meal:
  This is a by-product of the soybean extraction industry typically comprising about 45 wt. % raw protein, 30–32% non-nitrogenous components (principally starch and sugars), 6% fiber and very small quantities of fats. A typical moisture content is 12%.

Corn gluten:
  This is a principal by-product of the extraction of starch from corn which typically contains about 20–22% raw proteins, 50–52% non-nitrogenous components (principally sugars), 7% fiber, 2% fats.

The quantity of water in each starting material to be used in formulating the substrate of the invention was determined by subjecting a sample of each starting material to a temperature of 105–110° C. in an oven for 12–24 hours until it reached a constant weight. From the loss in weight of the sample, the moisture content could be easily calculated for each starting material. Based on the quantities of the peat, soybean meal, gluten and calcium carbonate to be mixed, the moisture content of the mixture could be calculated. The amount of water needed to increase the moisture content of the mixture to the desired level of 55 to 60% could then be easily determined.

Before mixing the individual components, it was necessary to break up the peat. This operation was carried out using a suitable cutting machine which caused the fragmentation of the peat filaments. Following such step, the four starting materials peat, soybean, gluten and calcium carbonate were put into a mixing machine. During the agitation and mixing of the four components, water was added in a previously calculated quantity sufficient to achieve the target moisture content of the product. After the mixture was homogeneous, it was placed into containers (bottles) suitable for the sterilization step. The bottles were closed using stoppers having surfaces made of cellulose to permit the exchange of gases. The sterilization conditions involving elevated temperatures (e.g. by way of a steam jacket) generally depend on the starting microbial level, the conditions under which the mixture was prepared as well as storage conditions.

At the end of the sterilization and subsequent cooling, the mycelium was introduced into the bottles after removing the stoppers. Four to five grams of inoculum were introduced per kilogram of substrate. The seeded containers were placed into incubation chambers at a temperature of 23–25° C. At the termination of the incubation (about 2 weeks), the mycelium was transferred into commercial-scale containers and maintained at a temperature of 10° C. for one week.

The substrate obtained achieves the intended aim and objects, since it is constituted by a single product hitherto produced in two separate production steps; it leads to a reduction in overall costs for the cultivation of mushrooms, and since it does not require the use of antiparasitic substances, it eliminates the possibility of residues in the final product, with obvious advantages for the consumer's health.

The substrate thus obtained furthermore allows faster growth of the mushroom, and it has been observed that the mycelium prevents the growth of molds and is therefore not attacked by them.

The substrate can of course be constituted by the most varied components within the scope of the above-stated functions and can have a composition according to the above-stated weight percent range for each component.

What is claimed:

1. A method for growing mushrooms comprising the following steps:

mixing the following components:

a) a water retaining-dispensing component;

b) a buffering component;

c) a protein-containing and growth-promoting component comprising one or more vegetable products, said vegetable products containing protein as a source of nitrogen and furthermore containing carbohydrates as an energetic source to promote growth; and d) water to give a substrate for mycelia growth;

wherein the water retaining-dispensing component a) is provided in an amount of 16 to 30% by weight of the total weight of components a), b), and c), and wherein the buffering component b) is provided in an amount of 25 to 50% by weight of the weight of the water retaining-dispensing component a), and wherein the protein-containing and growth-promoting component c) is provided in an amount of 50 to 80% by weight of the total weight of components a), b), and c), and wherein the water is provided in a sufficient amount such that the overall moisture in the substrate produced has a weight of 55 to 60% with respect to the overall weight of the substrate produced;

sterilizing the substrate produced;

inoculating said substrate with mushroom mycelia;

incubating the inoculated mushroom mycelia to produce mushrooms.

2. The method of claim 1, wherein said mycelia is Agaricus bisporus.

3. The method of claim 1, wherein four to five grams of an inoculum are introduced per kilogram of substrate.

4. The method of claim 1, wherein the incubation step is performed in incubation chambers at a temperature of 23–250° C.

5. The method of claim 1, further comprising the step of transferring the mycelia into containers and maintaining the transferred mycelia at a temperature of 10°C. for one week.

6. A method for growing mushrooms comprising the following steps:

providing a substrate consisting essentially of:

a) a water retaining-dispensing component;

b) a buffering component;

c) a protein-containing component;

d) a growth-promoting component; and e) water to give a substrate for mycelia growth;

wherein the water retaining-dispensing component a) is provided in an amount of 16 to 30% by weight of the total weight of components a), b), c), and d), and wherein the buffering component b) is provided in an amount of 25 to 50% by weight of the weight of the water retaining-dispensing component a), and wherein the protein-containing component c) is provided in an amount of 45 to 75% by weight of the total weight of components a), b), c), and d), and wherein the growth-promoting component d) is provided in an amount of 5 to 25% by weight of the total weight of components a), b), c), and d), and wherein the water is provided in a sufficient amount such that the overall moisture in the substrate produced has a weight of 55 to 60% with respect to the overall weight of the substrate produced;

sterilizing said substrate;

inoculating said sterile substrate with mushroom mycelia;

incubating the inoculated mushroom mycelia to produce mushrooms.

7. The method of claim 6 wherein said mycelia is Agaricus bisporus.

* * * * *